(12) United States Patent
Donley et al.

(10) Patent No.: US 9,521,432 B2
(45) Date of Patent: Dec. 13, 2016

(54) CORRECTION OF OVER-THE-AIR SIGNALS

(71) Applicant: Cable Television Laboratories, Inc., Louisville, CO (US)

(72) Inventors: Christopher Donley, Broomfield, CO (US); Isaac Elliott, Broomfield, CO (US); Thomas Williams, Longmont, CO (US); Belal Hamzeh, Westminster, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 217 days.

(21) Appl. No.: 14/259,061

(22) Filed: Apr. 22, 2014

(65) Prior Publication Data

US 2015/0304684 A1    Oct. 22, 2015

(51) Int. Cl.
*H03M 13/00* (2006.01)
*H04N 19/65* (2014.01)
*H04L 1/00* (2006.01)

(52) U.S. Cl.
CPC ............. *H04N 19/65* (2014.11); *H04L 1/00* (2013.01)

(58) Field of Classification Search
CPC .................................. H04N 19/65; H04L 1/00
See application file for complete search history.

(56) References Cited

U.S. PATENT DOCUMENTS

2010/0135444 A1* 6/2010 Lin ................. H04L 1/0053
375/346
2013/0132807 A1* 5/2013 Moreman ......... H04N 21/6375
714/807

* cited by examiner

*Primary Examiner* — Sam Rizk
(74) *Attorney, Agent, or Firm* — Great Lakes Intellectual Property, PLLC.

(57) ABSTRACT

Correction of errors within over-the-air signaling is contemplated. The error correction may include correcting over-the-air signaling used to facilitate transmitting content, broadcast television, etc. according to error correction data transmitted separately from the over-the-air signaling. A receiver may be configured to process the over-the-air signaling according to the error correction data so as to facilitate the contemplated error correction.

20 Claims, 4 Drawing Sheets

CORRECTION OF OVER-THE-AIR SIGNALS

TECHNICAL FIELD

The present invention relates to over-the-air signaling or other types of signaling where wireless transmissions take place between a transmitter and a receiver, such as but not necessary limited to those associated with broadcast television.

BACKGROUND

The over-the air broadcast of television or other content signaling can produce spotty reception for certain receivers depending on their relative positioning to a transmitter. In apartment complexes, for example, an apartment on one floor may receive signals without reception errors while another receiver on a neighboring floor may experience reception errors and/or a receiver on one floor may experience reception errors at different points of the transmission than a neighboring receiver on another floor. The reception errors may result from any number of signaling influences and may generally manifest in an inability of the receiver to properly decode an entirety of the corresponding transmission. In the case of television signaling where a plurality of video frames are transmitted using over-the-air signaling, the reception errors may result in an inability of a receiver to properly decode an entirety of a television program, movie, etc., which may result in the resulting playback or display having gaps or other interruptions inconsistent with the original transmission.

Forward error correction (FEC) codes, parity and other information may be included within the over-the-air signaling to facilitate correcting some reception errors, assuming that the FEC codes or other error correction data transmitted through the over-the-air signaling is itself properly received at the receiver. One non-limiting aspect of the present invention contemplates facilitating correction of reception errors when the FEC codes or other error correction data transmitted with the over-the-air signaling are improperly received and/or otherwise insufficient to facilitate proper access to the content.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The present invention relates to facilitating error correction for over-the-air signaling used to facilitate transmission of television, video, audio, phone calls, data and other content where forward error correction (FEC), parity or other data is added to the corresponding transmissions to facilitate subsequent correction of errors. The present invention applies equally to any number of signaling protocols and standards, such as but not necessary limited to orthogonal frequency division multiplexing (OFDM) and 8-VSB. While the scope and contemplation of the present invention is not necessarily limited to any one particular signaling protocol or standard, the description is predominantly set forth with respect to A/53: ATSC Digital Television Standard, Parts 1-6, 2007, as published by The Advanced Television Systems Committee (ATSC), the disclosure of which is hereby incorporated by reference in its entirety herein. An ATSC related portion of the disclosure of this patent document contains material which is not known to be, but may be subject to copyright protection. The ATSC standard is noted as one of many standards that employs FEC to facilitate correcting reception errors and certain materials associated therewith are reproduced herein for exemplary non-limiting purposes to demonstrate how the present invention may be adapted for use therewith.

Figure 1:
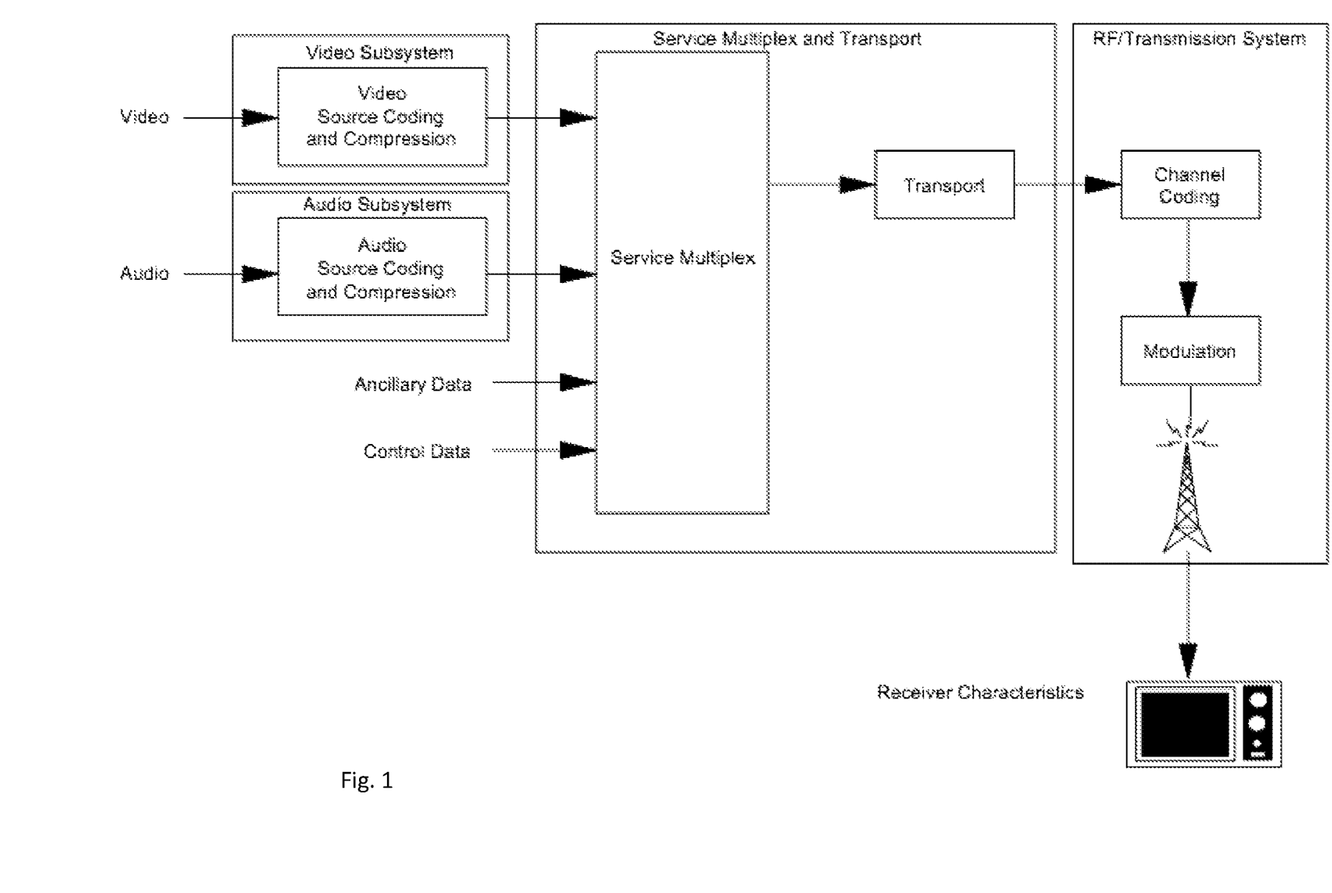
FIGS. 1-3 diagrammatically illustrate aspects of ATSC television signaling.
Figure 2:
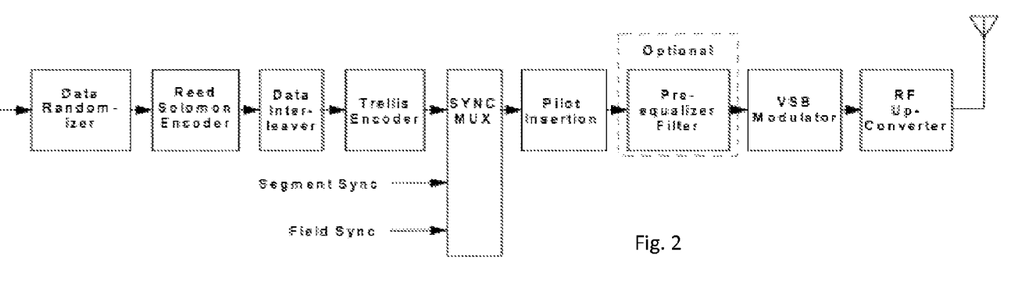
Figure 3:
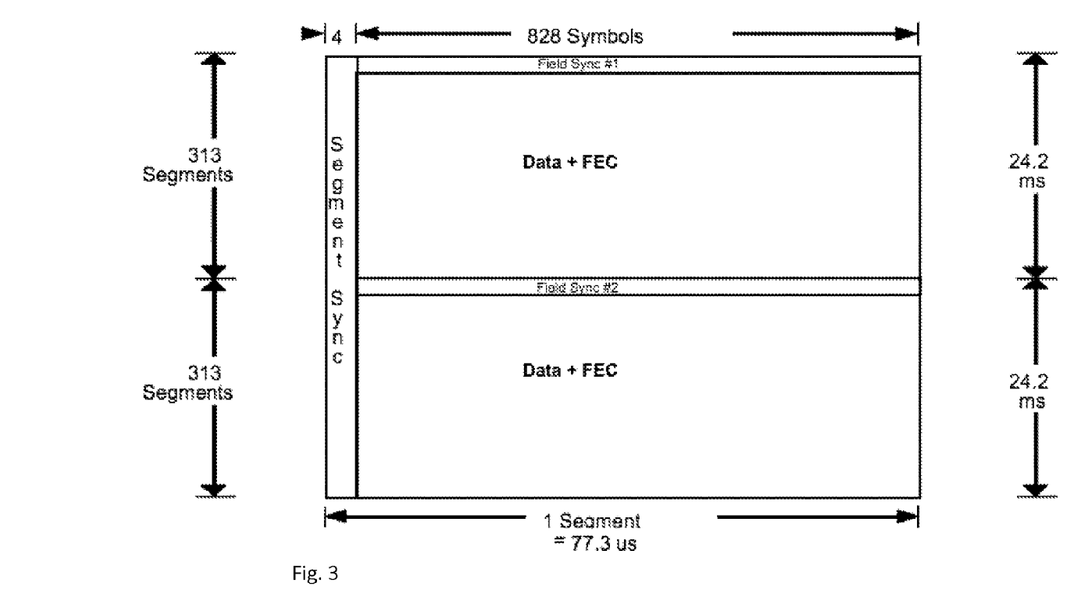

FIGS. 1-3 and the associated descriptions are reproduced from the Digital Television Standard noted above to illustrate a system designed to transmit high quality video and audio and ancillary data over a single 6 MHz channel. The system can deliver reliably about 19 Mbps of throughput in a 6 MHz terrestrial broadcasting channel and about 38 Mbps of throughput in a 6 MHz cable television channel. According to this model, the digital television system can be seen to consist of three subsystems: source coding and compression; service multiplex and transport and RF/transmission. The source coding and compression refers to the bit rate reduction methods, also known as data compression, appropriate for application to the video, audio, and ancillary digital data streams. The term "ancillary data" includes control data, conditional access control data, and data associated with the program audio and video services, such as closed captioning and can also refer to independent program services. The purpose of the coder is to minimize the number of bits needed to represent the audio and video information. The digital television system employs the MPEG-2 video stream syntax for the coding of video and the Digital Audio Compression (AC-3) Standard for the coding of audio. The service multiplex and transport refers to dividing the digital data stream into "packets" of information, uniquely identifying each packet or packet type, and the appropriate methods of multiplexing video data stream packets, audio data stream packets, and ancillary data stream packets into a single data stream.

The transport mechanism may support interoperability among digital media, such as terrestrial broadcasting, cable distribution, satellite distribution, recording media, and computer interfaces, was a prime consideration. The digital television system employs the MPEG-2 transport stream syntax for the packetization and multiplexing of video, audio, and data signals for digital broadcasting systems (ISO/IEC 13818-1), the disclosure of which is hereby incorporated by reference in its entirety herein. The RF/transmission refers to channel coding and modulation. The channel coder takes the data bit stream and adds additional information that can be used by the receiver to reconstruct the data from the received signal which, due to transmission impairments, may not accurately represent the transmitted signal. The modulation (or physical layer) uses the digital data stream information to modulate the transmitted signal. The modulation subsystem offers two modes: a terrestrial broadcast mode (8-VSB), and a high data rate mode (16-VSB). FIG. 2 illustrates a functional block diagram of the Main Service where incoming data is randomized and then processed for forward error correction (FEC) in the form of Reed-Solomon (RS) coding (20 RS parity bytes are added to each MPEG-2 packet), one-sixth data field interleaving and two-thirds rate trellis coding. The randomization and FEC processes are not applied to the sync byte of the transport packet, which is represented in transmission by a Data Segment Sync signal. Following randomization and forward error correction processing, the data packets are formatted into Data Frames for transmission and Data Segment Sync and Data Field Sync are added. FIG. 3 shows how the data (frames) are organized for transmission.

Figure 4:
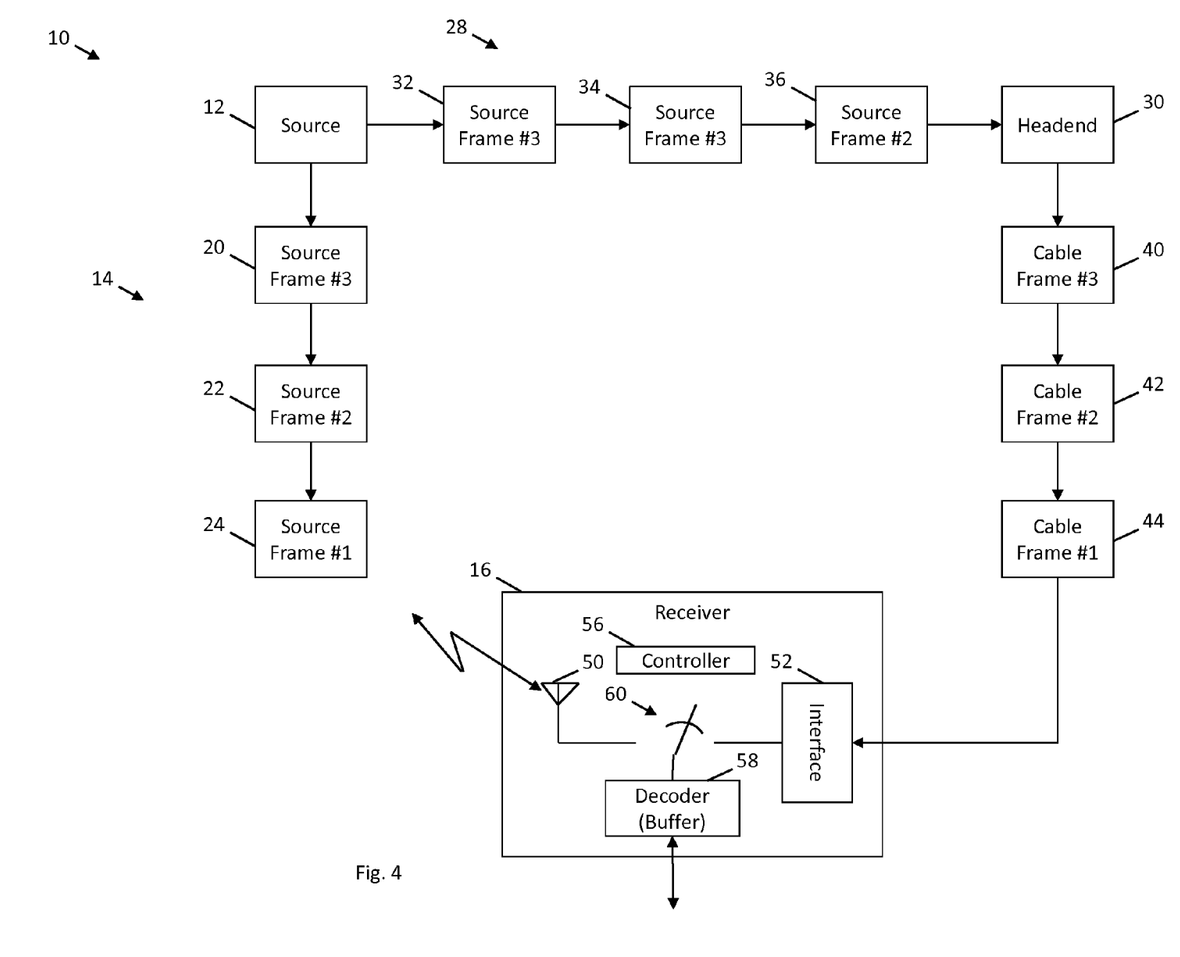
FIG. 4 illustrates an over-the-air signaling system in accordance with one non-limiting aspect of the present invention.

FIG. 4 illustrates an over-the-air signaling system 10 in accordance with one non-limiting aspect of the present invention. The system 10 illustrates an exemplary configuration were a source/transmitter 12 emits over-the air signaling 14 for receipt at a receiver 16, such as to facilitate transmission of television signals, audio signals, videos signals, cellular phone signals, etc. The system 10 may apply to any type of wireless or wireline signaling and is described predominantly for exemplary non-limiting purposes with respect to the above-described ATSC signaling. The source 12 may be configured in the manner described above to facilitate transmitting the wireless, over-the-air signaling using vestigial sideband modulation of corresponding frames with eight or sixteen discrete amplitude levels. The signaling may include audio and/or video frames, interchangeable referred to as data frames or frames, being transmitted to the receiver with FEC codes, parity or other error correction data useable by the receiver 16 to construct the frames from the modulated signaling. Three source frames 20, 22, 24 are shown for descriptive purposes as any number of frames may be transmitted and the frames may be transmitted in non-linear or non-sequential order depending on the content being transmitted. The over-the-air signaling may be broadcasted/multi-casted to a particular geographical area and/or unicast to the receiver.

The source 12 is shown to transmit a second set of signaling 28 to a headend 30 to facilitate delivering copied source frames 32, 34, 36 using over-the-air signaling and/or as non-over-the air signaling, such as through a coaxial cable, fiber optic or other wireline medium connected between the source 12 and the headend 30. The headend 30 may be configured to facilitate subsequently transmitting a plurality of cable frames 40, 42, 44 over a hybrid-fiber coax (HFC) medium to the receiver 16 or through other suitable broadcast/multicast and/or unicast transmission. The cable frames 40, 42, 44 are separately labeled from the other frames 20 1022, 24, 32, 34, 36 in order to demonstrate one non-limiting aspect of the present invention where the headend 30 associated with a cable service provider repackages content from the source 12 for transmission to the receiver 16 or multiple receivers (not shown) over a cable network or other proprietary system. The cable frames 40, 42, 44 may be copies or replications of the frames 32, 34, 36 issued from the source or re-packaged or re-processed constructs independently generated at the headend 30 to facilitate one or more of the operations contemplated herein. The headend 30 is illustrated for exemplary non-limiting purposes as any other device having capabilities sufficient to enable the operations described herein may be used without deviating from the scope contemplation of the present invention, e.g., a cable modem termination system (CMTS), Internet service provider (ISP), etc.

The receiver 16 may be configured to facilitate receiving the signaling transmitted from the source 12 and the headend 30 at a corresponding first and second interface 50, 52. The first interface 50 is illustrated as an antenna or other suitable wireless interface (a single antenna is shown but the antenna may include multiple antennas or an antenna array sufficient to facilitate multiple-import multiple-output (MIMO) or long term evolution (LTE) signaling) and the second interface 52 is illustrated as a coaxial cable interface or other wireline interface. While the first and second interfaces 50, 52 are illustrated and described as respective wireless wireline interfaces, the interfaces may be configured differently without deviating from the scope contemplation of the present invention, e.g., a common interface may be utilized if it is sufficient to receive wireless signals from the source 12 and wireless or wireline signals from the headend 30. The first and second interfaces 50, 52 are described in order to demonstrate one non-limiting aspect of the present invention where frames or other signaling associated with the content being transmitted from the source 12 are separately or independently delivered to the receiver 16, such as through different networks and/or delivery mediums associated with the source and headend 12, 30. A controller 56 may be included to facilitate controlling and/or processing signals with interfaces 50, 52 and/or other interfaces (not shown) on the receiver 16.

The receiver 16 may be configured as a set-top box (STB), a gateway, a television, a computer or a component included in a computer tablet, a mobile or cellular phones or other device having capabilities sufficient to facilitate operations contemplated herein. As one non-limiting aspect of the present invention contemplates facilitating television signaling using the ATSC standard, the receiver 16 is described as including a decoder 58 or media player having a buffer and/or other mechanisms sufficient to facilitate displaying or otherwise interfacing audio and/or video carried within the source and/or cable frames to a display or other user interface. The controller 56 may include a non-transitory computer-readable medium having a plurality of non-transitory instructions operable with a processor (not shown) to facilitate controlling the receiver 16 or otherwise enabling execution of the operations and processes contemplated herein. A switch 60 may be included to enable the controller 56 to selectively determine which one or more frames are delivered to the decoder 58, e.g., to selectively control delivery of the source and/or cable frames on an individual frame or multi-frame basis to the decoder 58. The switch 60 is shown to be operable between a first position sufficient to connect the first interface 50 to the decoder 58 and a second position sufficient to facilitate connecting the second interface 52 to the decoder 58 (Optionally, signaling processing may be required to compensate for differing signaling formats for the first and second interfaces 50, 52). The switch is only shown for illustrative purposes as the corresponding operations may be achieved through digital signal processing (DSP) or other suitable software controls, i.e., without use of the switch 60.

The receiver 16 is diagrammatically illustrated to highlight main functional elements as it may be configured differently and/or may include different communication paths or capabilities to achieve the operations and results contemplated by the present invention to facilitate improving over-the-air signal transmissions. One non-limiting aspect of the present invention contemplates improving such over-the-air or other wireless signaling transmissions used to transmit television signals by enabling the receiver 16 to process the over-the-air signaling (e.g., the wireless received source frames) and according to the non-over-the-air signaling (e.g., the wireless and/or wireline received cables frames) when the over-the-air signaling is improperly received or other reception errors occur. The controller 56 may be configured to assess reception errors, decoding incapability or other problems attendant to an inability of the decoder 58 to properly interface the over-the-air signaling or to otherwise replicate that original or intended form of the over-the-air transmitted content. The controller 56, for example, may monitor processing or other operations being performed at the decoder 58 to determine reception errors, such as but not necessarily limited to the reception errors identified above where the particular error is determined at a relative to a current position of the receiver 16, e.g., one receiver in the home experience a reception area while a neighboring or nearby receiver may experience no reception errors or different reception errors.

The controller 56 may be configured to facilitate creating or otherwise generating corrections for the reception errors or to address other needs to supplement or re-create the source frames 20, 22, 24 received through the over-the-air signaling (any errors requiring correction are hereinafter referred to as reception errors even if the errors are not particular to the receiver or if the errors do not occur at the receiver). The corrections may be generated differently depending on the particular reception error or the needs of the decoder 58 and are described for exemplary non-limiting purposes to correspond with the decoder 58 being provided FEC codes or other parity data sufficient to facilitate re-creating source frames 20, 22, 24 or other signaling received through the over-the-air transmissions and/or the decoder being provided independent copies of the affected source frames 20, 22, 24 such that the output frames are entirely re-created solely from audio/video provided through the cable frames 40, 42, 44, e.g., through retransmission of the over-the-air signaling. Optionally, timestamps or other timing information may be included within the source/cable frames to facilitate generating and timing insertion of the contemplated corrections.

The cable frames 40, 42, 44 transmitted to the second interface 52 may be configured to facilitate delivering correction data to the receiver 16 for use in generating the contemplated corrections. The correction data may be the FEC codes included within the source frames 32, 34, 36 transmitted to the headend 30 and/or the entire source frames 32, 34, 36 transmitted to the headend 30, optionally with some additional syncing, timing or other data network attendant to facilitating the transmission thereof from the headend to the receiver. In the case of providing only the FEC codes, the cable frames 40, 42, 44 may not include the audio/video data that would be included when generating the corrections as entirely new frames. The ability of the present invention to provide the receiver 16 with information sufficient to facilitate re-creating the over-the-air transmitted frames subject to reception errors using FEC codes and/or entirely new frames that are unlikely to be susceptible to the same reception errors due to being transmitted through the second interface may be particularly beneficial in improving the over-the-air television signaling or other over-the-air content signaling by enabling the receiver 16 to selectively switch between communication mediums depending on signaling performance.

One non-limiting aspect of the present invention contemplates the receiver 16 operating in a preferential mode where signaling through one of the first and second interfaces 50, 52 is preferred over the other. Signaling through the first interface 50 may be preferred over the second interface 52, for example, due to retransmission costs or other signaling costs associated with transmitting the cable frames 40, 42, 44 via the cable network or other proprietary network associated with the second interface 52. The over-the-air signaling, at least from a cable service provider or other data service provider point of view, may be essentially free whereas supporting transmission of the same content or material through the second interface 52 may not be essentially free due to attendant bandwidth consumption. While the headend 30 is shown to communicate with the second interface 52, a server or other device may similarly communicate the correction data (e.g., cable frames) through Internet Protocol (IP) signaling, such as that carried over the Internet or web. The delivery of the correction data through the Internet may be an option to facilitate delivery to the second interface 52 over a different communication medium, particular one suitable to communicating through non-proprietary interfaces such as those typically associated with cable networks.

Optionally, the receiver 16 may be configured to share the source and/or cable frames or other data provided through the first and second interfaces 50, 52 to other devices or receivers within the home or connected to a common network, such as using Multimedia over Coax Alliance (MoCA) signaling, Wi-Fi signaling, peer-to-peer networking, etc. The capability to share the correction data amongst multiple receivers may be beneficial in order to enable each receiver to individually determine its own reception errors and to correct those errors using the techniques described herein. The over-the-air signaling received through the first interface 50 may be similarly shared amongst other devices connected within the home or a shared network to facilitate interfacing content with other devices, such as a second screen application or television lacking the receiver capabilities sufficient to receive the signaling associated with the first and second interfaces 50, 52 and/or in the event a home includes a single gateway for interfacing content throughout. The first and/or second interfaces 50, 52 may facilitate MIMO signaling, such as in the manner described in U.S. patent application Ser. No. 14/181,640, 14/181,641 and 14/181,643, the disclosures of which are hereby incorporated by reference in their entireties herein.

Figure 5:
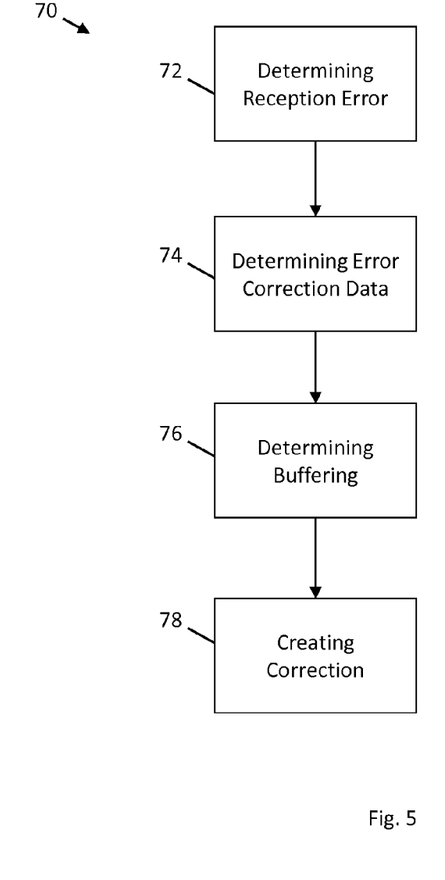
FIG. 5 illustrates a flowchart of a method for improving over-the-air signaling in accordance with one non-limiting aspect of the present invention.

FIG. 5 illustrates a flowchart 70 of a method for improving over-the-air signaling in accordance with one non-limiting aspect of the present invention. The method may be embodied in a computer-readable medium having a plurality of non-transitory instructions operable with the receiver or other sufficiently configured device to facilitate the operations contemplated herein. Like the illustrations above, the method is predominantly described with respect to facilitating correction of reception errors included within the ATSC or other television related signaling so as to enable the decoder to facilitate properly interfacing audio/video frames with a user or display. This is done without limiting the scope contemplation of the present invention as the present invention fully contemplates facilitating correction of reception errors associated with any type of content and not necessarily just signaling associated with over-the-air multicast/unicast television. The method also presumes the use of FEC codes to facilitate re-creating or otherwise re-constructing frames as other parity data or information can be similarly used without deviating from the scope contemplation of the present invention.

Block 72 relates to determining one or more reception errors in over-the-air signaling transmitted to a receiver. The reception errors may correspond with any inability of a decoder or other interface on a receiver lacking an ability to properly interface received signaling with a participant. The reception error determinations may include identifying a particular frame, timestamp or other sequence indicator associated with the underlying content, such as to facilitate identifying each portion or length of the signaling experiencing a reception error and/or to differentiate one reception error from another according to time or sequence. Block 74 relates to determining error correction data. The error correction data may be determined from signaling received separately or independently from the over-the-air signaling, such as through a separate medium or network over which the correction data may be transmitted without being susceptible or unlikely to be susceptible to the reception errors affecting the over-the-air signaling. The error correction data may correspond with a re-transmission of the same content as that being transmitted through the over-the-air signaling and/or a smaller subset of the corresponding signaling, such as but not necessary limited to the FEC codes or other error correction data transmitted along with the content included within the over-the-air signaling.

Block 76 relates to determining buffering needed at the receiver. The buffering may relate to a period of time needed for the receiver to buffer the over-the-air signaling in order to enable receipt of the corresponding correction data prior to the matching or related portion of the over-the-air signaling being displayed or otherwise interfaced for output. The buffering may be necessary due to the over-the-air signaling arriving at the receiver prior to the matching correction data, e.g., in the event the correction data is generated from the same transmission is over-the-air signaling, it may take longer for that data to reach the receiver than the corresponding over-the-air signaling due to propagation delays associated with the processing necessary to facilitate its transmission to the receiver. In the event the correction data were to experience a quicker passage to the receiver than the over-the-air signaling, then a similar buffering analysis may be performed in order to ensure is that the correction data or correction frames align with corresponding frames in the over-the-air signaling, optionally with a device upstream of the receiver buffering the correction data instead of the receiver performing the buffering. The buffering determination may be calculated to be at least as long as an elapse time associated with the difference in arrival time between matching frames of the over-the-air signaling and the correction data. A calculation may be performed by the receiver and/or a device upstream thereof having a preview of signaling transmission times for any number of receivers, such as at the headend to ensure signals arrive just in time.

Block 78 relates to creating corrections for each one or more reception error. The corrections may generally correspond with a re-creation of the frames or other portions of the over-the-air signaling experiencing the reception error. The re-creations may be played back or otherwise inserted or provided to the decoder in place of the portion(s) of the over-the-air signaling having the reception error(s) so as to facilitate display of the content as originally intended by the source. Optionally, advertisements or other media may be inserted within the re-creation according to the correction data so as to enable digital program insertion or other receiver-level customization of the content associated with the over-the-air signaling, which may be beneficial in enabling a service provider associated with transmitting the correction data to provide advertisements or otherwise gain some benefit from the receiver relying upon its correction data to adjust or otherwise improved performance of the over-the-air television signaling. The correction data may be provided from the headend to multiple receivers through a multicast such that multiple receivers received the same customizations/corrections and/or the correction data may be provided unicast on a per receiver basis so that individual receivers may utilize different customizations/corrections.

The corrections may be generated using the correction data by matching timestamps or other identifiers to facilitate determining matching are related portions of the over-the-air data in the correction data. Once the related portions are identified, the correction data may be applied to the over-the-air signaling to generate the corrections and corresponding insertion or other manipulation necessary to facilitate its use in place of the error affected portion of the over-the-air signaling. One non-limiting aspect of the present invention contemplates the correction data being used to transmit the FEC codes included within the over-the-air signaling so that any improperly received portions of the over-the-air signaling can be re-created from the corresponding FEC codes transmitted as the correction data. One non-limiting aspect of the present invention contemplates a the correction data being used to transmit entire frames or re-transmission of the over-the-air television signals so that any improperly received portions of the over-the-air signaling can be re-created from entire frames or other matching signaling transmitted as a correction data. Optionally, the receiver may be configured or instructed to selectively determine whether to generate the creations by applying the FEC codes to the received over-the-air signaling or instead avoid processing of the over-the-air signaling altogether in favor of reproducing the underlying content solely from the matching re-transmission included within the correction data.

As supported above, one non-limiting aspect of the present invention contemplates a switch or other logical constructs sufficient to enable a receiver to selectively use a pure antenna (first interface) or a pure cable (second interface) depending on quality of over-the-air signaling or other operational constraints, e.g., it may be typically desirable to utilize over-the-air signaling while at other times it may be desirable to switch between the over-the-air signaling in the cable signaling or to entirely reliant on the cable signaling (cable signaling is noted but other mediums may be used or associated with the second interface). The capabilities to selectively determine which one or more interfaces are relied upon by a receiver may be beneficial for a corresponding a cable operator or a multiple system operator (MSO) to control a portion or a percentage of their subscribers receiving or relying upon content delivery through over-the-air signaling. Additionally, the present invention contemplates a "sometimes" cable and "sometimes" antenna solution so as to enable a cable operator to facilitate allocation of bandwidth or other network resources depending on the quality of the over-the-air signaling, e.g., when the signaling is sufficient, the over-the-air signaling may be utilized in order to spare or allocate network resources to other bandwidth consuming operations, such as to reclaim bandwidth to support bandwidth intensive operations, such as unicast of particular television programs or channels to multiple receivers. A service provider may be able to provide switched-digital or other periodic channel delivery to subscribers by forcing receivers to tune to over-the-air signaling for some channels so that the bandwidth typically consumed with transmitting those channels can instead be used to transmit unicast channels or temporarily support additional channels.

Various aspects of the present invention may include: making a TV picture from the cable system data even if no off-air antenna is connected to the STB; making a TV picture from the cable system data when an off-air antenna is connected, even if the off-air signal is unidentifiable or not present; making a TV picture with the help of the cable system data (even full help) when the off-air signal is identifiable; and making a TV picture with the help of the cable system data (even full help) when the timing of the off-air signal can be determined. Optionally, variable delay may be utilized to synchronize the cable signal with the broadcast signals for some of the cases above. Other variants may include TV signaling being singlecast to the subscriber, so required delay is determined by the cable operator and/or TV signaling being multicast to all subscribers, so required delay is programmed by the STB (e.g. shift register) the number of bits in a STBs shift register is not too bad, maybe only 2500 bytes to cover a delay variation of 100 km.

One non-limiting aspect of the present invention contemplates an 8VSB transmission starts a segment with 4 symbol sync. The 8VSB in the receiver in the home first locates the segment sync timing (optional) and next it receives an uncorrupted future signal segment of the off-air signal in analog baseband format from the Web and convolves the received off-air signal with the uncorrupted future signal segment to obtain a timing offset number from some reference point, which may be the transmitter. Using the timing offset, the Web 8VSB broadcast server starts providing backup FEC blocks to the off-air receiver. The architecture of the FEC decoder may include a trellis decoder, de-interleaver, Reed-Solomon (RS) decoder and de-randomizer. If the backup FEC block from the Web server is needed because the received FEC block is bad, it may be used, otherwise the off-air signal may be used. Statistics may be gathered from off-air receiver to identify a percentage of FEC blocks that were erred. Other higher or lower level methods of supplying the correct signal, including symbol level, data segment or field sync segment may be utilized without deviating from the scope contemplation of the present invention.

One non-limiting aspect of the present invention relates to transmitting FEC error correction codes over a cable network to improve reception of over-the-air broadcast TV signals. This may be accomplished with a customer attaching an antenna to a set top box to receive over-the-air content. This content can be stored on a DVR, distributed throughout the house via MoCA or Wifi, or displayed on a local TV. It can also be integrated into the cable operator's channel. The cable operator can then transmit FEC error correction codes sufficient for the STB to re-create a 'clean' signal. Optionally, the cable operator may avoid having to send down the original signal, and the STB can instead rely on over-the-air reception to provide the original signal. If the antenna is disconnected from the STB, the STB may optionally be configured to avoid re-creating the signal from the error correction codes depending on licensing restrictions rather requirements. The STB can use a buffer to account for the difference in reception times between the over-the-air signal and cable signal. This invention may eliminate the need for MSOs having to retransmit broadcast signals over the cable plant—they rely on antenna reception. However, customers still get the cable QoE and channel guide that they are used to with cable service.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method to improve over-the-air television signals comprising:
   determining occurrence of a reception error within a portion of over-the-air television signals being received at a receiver or a susceptibility of the portion of the over-the-air television signals being received at the receiver to the reception error; and
   facilitating creation of a correction based at least in part on error correction data being received at the receiver proximate in time and separately from the over-the-air television signals, the correction facilitating display of the portion with correction of the reception error so as to improve the over-the-air broadcast television signals.

2. The method of claim 1 further comprising:
   determining the portion to correspond with one or more video frames of a plurality of video frames being sequentially transmitted within the over-the-air television signals;
   determining the error correction data to be forward error correction (FEC) code transmitted to the receiver proximate in time to the one or more video frames of the portion and separately from the over-the-air broadcast television signals; and
   creating the correction by applying the FEC code to the portion.

3. The method of claim 1 further comprising:
   determining the portion to correspond with a first one or more video frames of a first plurality of video frames being sequentially transmitted within the over-the-air television signals;
   determining the error correction data to be a second one or more video frames of a second plurality of video frames being sequentially transmitted to the receiver in concert with the first plurality of video frames and separately from the over-the-air broadcast television signals such that matching ones of the first and second plurality of video frames arrive at the receiver at approximately the same time; and
   creating the correction by replacing one or more of the first one or more video frames with a matching one or more video frames from the second one or more video frames.

4. The method of claim 3 further comprising replacing the one or more of the first one or more video frames with the matching one or more video frames from the second one or more video frames by actuating a switch included in the receiver from a first position associated with a first interface to a second position associated with a second interface, the first position connecting a decoder configured to decode the first and second plurality of video frames for output to a display to the first interface, the second position disconnecting the decoder from the first interface and instead connecting the decoder to the second interface, the first interface receiving the over-the-air broadcast television signals and the second interface receiving the error correction data through non-over-the-air signals.

5. The method of claim 1 further comprising: at least one of:
   i) recovering the error correction data from one or more packets transmitted to the receiver over the Internet using Internet Protocol (IP) addressing; and ii) recovering the error correction data from signals transmitted to the receiver over a coaxial cable from a headend; and determining the over-the-air broadcast television signals from signals transmitted to the receiver having vestigial sideband modulation with eight discrete amplitude levels.

6. The method claim 1 further comprising:

determining a transmission time associated with arrival at the receiver of a plurality of video frames included within the over-the-air television signals; and timing transmission of the error correction data to the receiver as a function of the transmission time such that the error correction data necessary for each of the plurality of video frames arrives at the receiver proximate to the corresponding one of the plurality of video frames so as to ensure the receiver is able to generate the correction without disrupting playback of the plurality of video frames and without the receiver having to request the error correction data after determining the reception error.

7. The method of claim 1 further comprising transmitting an advertisement to the receiver as part of the error correction data in order to display the advertisement as part of the correction, the advertisement not being included in the over-the-air television signal received at the receiving.

8. A non-transitory computer-readable medium having a plurality of instructions operable with a processor of a receiver to facilitate over-the-air content signaling, the instructions being sufficient to facilitate:

determining a reception error identified for a portion of the over-the-air content signaling following receipt at the receiver, the reception error being determined at the receiver from processing of the received over-the-air television signaling; and generating a correction for the reception error according to error correction data transmitted to the receiver separately from the over-the-air content signaling, the correction facilitating display of the portion with correction of the reception error and with addition of an advertisement not included within the received over-the-air television signaling.

9. The non-transitory computer-readable medium of claim 8 further comprising instructions sufficient for determining the reception error to correspond with one or more video frames associated with the portion that a decoder of the receiver is unable to decode for display.

10. The non-transitory computer-readable medium of claim 9 further comprising instructions sufficient for:

re-creating the one or more video frames according to the error correction data such that the decoder is able to decode the re-created video frames for display;

creating the advertisement as one or more advertisement video frames determined according to the error correction data such that the decoder is able to decode the one or more advertisement video frames for display.

11. The non-transitory computer-readable medium of claim 10 further comprising instructions sufficient for re-creating the one or more video frames using forward error correction (FEC) codes included within the error correction data.

12. The non-transitory computer-readable medium of claim 10 further comprising instructions sufficient for re-creating the one or more video frames by replacing the one or more video frames with a corresponding one or more video frames included within the error correction data.

13. A receiver configured to facilitate display of video frames transmitted through over-the-air broadcast television signals comprising:

a first interface configured to continuously receive the over-the-air broadcast television signals through an antenna;

a second interface configured to continuously receive error correction data transmitted separately from the over-the-air broadcast television signals through a wired medium; and a controller operable with the first and second interface to facilitate correcting errors the video frames carried within the over-the-air broadcast television signals according to the error correction data, the continuous receipt of the error correction data thereby enabling the controller to correct errors in the video frames without having to issue requests for the error correction data after determining the errors.

14. The receiver of claim 13 wherein the controller executes with a processor a plurality of non-transitory instructions stored within a non-transitory computer-readable medium of the receiver, the non-transitory instructions being sufficient for the controller to correct the errors within the video frames according to forward error correction (FEC) codes included within the error correction data.

15. The receiver of claim 14 wherein the non-transitory instructions are sufficient for the controller to:

calculate timing differences between the over-the-air broadcast television signals received through the first interface and the error correction data received through the second interface;

determine the errors to correspond one or more error frames of the video frames incapable of being decoded with a decoder of the receiver configured to facilitate display of the video frames; and selecting the FEC codes necessary for correcting the errors based on the timing differences such that the selected FEC codes match with the FEC codes generated for the one or more error frames.

16. The receiver of claim 15 wherein the non-transitory instructions are sufficient for the controller to:

determine video timestamps associated with the video frames received through the first interface;

determining FEC timestamps associated with the FEC codes received through the second interface; and determining the timing differences based on differences between the video timestamps and the FEC timestamps.

17. The receiver of claim 13 wherein the controller executes with a processor a plurality of non-transitory instructions stored within a non-transitory computer-readable medium of the receiver, the non-transitory instructions being sufficient for the controller to replace first video frames of the video frames received through the first interface having on the errors with second video frames included within the error correction data received through the second interface.

18. The receiver of claim 17 further comprising the non-transitory instructions being sufficient for the controller to control a buffer and a decoder of the receiver to buffer the video frames received through the first interface for a period of time sufficient to enable the decoder to replace the first video frames with the second video frames and thereafter enable the decoder to begin playback of the video frames immediately following the first video frames without disruption.

19. The receiver of claim 17 further comprising the non-transitory instructions being sufficient for the controller to buffer the video frames to enable the decode to playback the second video frames when the second video frames include more video frames than the first video frames due to the second video frames including one or more advertisements not included in the first video frames.

20. The receiver of claim 13 wherein the controller executes with a processor a plurality of non-transitory instructions stored within a non-transitory computer-readable medium of the receiver, the non-transitory instructions being sufficient for the controller to facilitate wirelessly transmitting the error correction data received through the second interface to additional receivers connected to a local wireless network, the additional receivers lacking capabilities to receive the error correction data through the wired medium and including capabilities to receive the over-the-air broadcast television signals also being received at the first interface, the additional receivers processing the received error correction data to facilitate correcting errors in video output therefrom as a function of the received over-the-air broadcast television signals.

\* \* \* \* \*